United States Patent
Kim

(10) Patent No.: US 8,688,032 B2
(45) Date of Patent: Apr. 1, 2014

(54) MOBILE COMMUNICATION REPEATING METHOD IN MOVING OBJECT AND REPEATER THEREOF

(75) Inventor: Duk-Yong Kim, Gyeonggi-do (KR)

(73) Assignee: KMW Inc. (KR)

( * ) Notice: Subject to any disclaimer, the term of this patent is extended or adjusted under 35 U.S.C. 154(b) by 772 days.

(21) Appl. No.: 12/741,314

(22) PCT Filed: Nov. 6, 2008

(86) PCT No.: PCT/KR2008/006538
§ 371 (c)(1),
(2), (4) Date: Aug. 13, 2010

(87) PCT Pub. No.: WO2009/061136
PCT Pub. Date: May 14, 2009

(65) Prior Publication Data
US 2010/0297937 A1    Nov. 25, 2010

(30) Foreign Application Priority Data

Nov. 6, 2007  (KR) .......................... 10-2007-0112807

(51) Int. Cl.
*H04B 7/15*    (2006.01)
(52) U.S. Cl.
USPC .......................... 455/11.1; 455/12.1; 455/13.1
(58) Field of Classification Search
USPC ............................................... 455/11.1–13.1
See application file for complete search history.

(56) References Cited

U.S. PATENT DOCUMENTS

| | | | |
|---|---|---|---|
| 7,412,207 B2 * | 8/2008 | Poykko | 455/11.1 |
| 7,486,931 B2 * | 2/2009 | Cho et al. | 455/39 |
| 7,809,330 B2 * | 10/2010 | Cho et al. | 455/39 |
| 8,041,334 B2 * | 10/2011 | Yoon | 455/404.2 |

(Continued)

FOREIGN PATENT DOCUMENTS

| | | | |
|---|---|---|---|
| JP | 2002305474 A | 10/2002 | |
| JP | 2003032739 A | 1/2003 | |

(Continued)

*Primary Examiner* — Bobbak Safaipour

(57) ABSTRACT

A repeater installed in a moving object is provided, in which a link antenna module has a plurality of link antennas steered to predetermined directions, for wirelessly communicating with a Base Transceiver Station (BTS), a link antenna path setting module selects at least one of the plurality of link antennas of the link antenna module and connects a path between the selected link antenna and a rear end, a service antenna module has at least one service antenna installed within the moving object, for wirelessly communicating with Mobile Stations (MSs) within the moving object, a relay signal processing module is connected to the link antenna module through the link antenna path setting module and processes transmission and reception relay signals between the link antenna module and the service antenna module, a movement information module measures current movement information about the moving object and provides the current movement information, a received signal measuring module measures a received signal of the link antenna module and providing current propagation environment information, and an antenna control module detects a current movement state and a current propagation environment based on the information received from the received signal measuring module and the movement information module, stores and/or updates the information in an internal propagation environment information storage, and controls the link antenna path setting module to select a link antenna that receives the best signal from a serving BTS at each location according to the stored information.

21 Claims, 10 Drawing Sheets

(56) References Cited

U.S. PATENT DOCUMENTS

| | | | |
|---|---|---|---|
| 8,064,380 B2 * | 11/2011 | Bims | 370/315 |
| 8,116,811 B2 * | 2/2012 | Kobayashi et al. | 455/552.1 |
| 2005/0221754 A1 * | 10/2005 | Poykko | 455/11.1 |
| 2006/0019600 A1 * | 1/2006 | Lin et al. | 455/3.02 |
| 2006/0106534 A1 * | 5/2006 | Kawamata et al. | 701/208 |
| 2007/0178832 A1 * | 8/2007 | Gavrilovich | 455/11.1 |

FOREIGN PATENT DOCUMENTS

| | | |
|---|---|---|
| JP | 2003188813 A | 7/2003 |
| JP | 2005159448 A | 6/2005 |
| JP | 2006262176 A | 9/2006 |
| JP | 2006262177 A | 9/2006 |
| WO | WO9923769 A1 | 5/1999 |
| WO | WO2006137259 A1 | 12/2006 |

* cited by examiner

| LOCATION | DIRECTION | LINK ANTENNA | PILOT SIGNAL | STRENGTH | EC/IO | ... |
|---|---|---|---|---|---|---|
| 1 | → | ANT 1 | A | 000 | 000 | ... |
| | | ⋮ | ⋮ | ⋮ | | ... |
| | | ANT N | A | 000 | 000 | ... |
| ⋮ | ⋮ | ⋮ | ⋮ | ⋮ | ⋮ | ⋮ |
| 4 | ↗ | ANT 1 | A B C | | | |
| | | ⋮ | | | | |
| | | ANT N | A B C | | | |
| ⋮ | ⋮ | ⋮ | ⋮ | ⋮ | ⋮ | ⋮ |

# MOBILE COMMUNICATION REPEATING METHOD IN MOVING OBJECT AND REPEATER THEREOF

BACKGROUND OF THE INVENTION

1. Field of the Invention

The present invention generally relates to a mobile communication repeating technology in a cellular mobile communication network. More particularly, the present invention relates to a repeater mounted to a moving object such as a bus, a vehicle, a train, a subway, and a ship and a wireless communication repeating method.

2. Description of the Related Art

In general, a cellular mobile communication network includes a Mobile Switching Center (MSC), a Base Station Controller (BSC), a Base Transceiver Station (BTS), and a Mobile Station (MS). It expands service coverage by installing multiple BTSs. Due to natural or artificial topographical obstacles, a communication shadowing area exists in which an MS cannot receive a signal from a BTS reliably. To relay signals between the BTS and the MS, a wired or wireless repeater is installed in the communication shadowing area. Especially some wireless repeaters are mounted onto moving objects such as mass transportation means provide an active wireless communication service to MSs within the moving objects.

Meanwhile, in a mobile communication service for MSs within a moving object, the MSs move fast between cells and thus handoff occurs very often at short intervals between the MSs of the mobbing object and the BTS of each cell. Therefore, techniques for handling the frequent handoffs or solving the problem are considered significant.

FIG. 1 illustrates a handoff in a mobile communication system. With reference to FIG. 1, a general handoff will be described. Referring to FIG. 1, when an MS 110 moves out of the serving cell area 130 of a serving BTS 120 and enters into another area, for example, another channel, another sector, another BTS, another BSC or another MSC, a handoff function is performed to maintain the communication path of the MS in the mobile communication system.

The handoff functions to switch the MS to new propagation resources and thus to maintain an on-going call, when a signal strength becomes weak during the call due to the movement of the MS. During the handoff, the MS continues to monitor the signal strengths of the serving BTS and neighbor BTSs, compares them, and switches the call to a destination BTS to continue the call.

Although the service area of a single BS covers a few kilometers, it sometimes covers tens of meters in a densely populated area like a metropolitan area. Handoff occurs more frequently when the distance between BTSs is small as in this case.

In the mean time, in a special propagation environment, i.e. when the MS receives a weaker signal from a geographically near BTS than from a relatively remote BTS due to topographical obstacles such as buildings, the MS performs a handoff to the remote BTS offering a good propagation environment, rather than to a neighbor BTS. Once the MS moves out of the special area, it repeats handoff to neighbor BTSs. Particularly when there area many topographical objects near the MS or the MS moves often, a severe multi-path fading results, increasing a handoff occurrence rate.

As a consequence, the call is highly probable to be disconnected in the process of the MS's repeated handoffs and overall system quality is affected.

Soft handoff is a Make Before Break scheme that connects a call after simultaneously catching signals from a plurality of BTSs. Since a plurality of BTSs usually allocate communication channels redundantly to a single MS during handoff, the use efficiency of radio channel resources drops considerably.

Especially for BTSs covering paths of mass transportation vehicles such as buses, the subway, and trains, multiple passengers make calls and move across a plurality of BTSs for a short time. Accordingly, the resulting frequent handoffs decrease the use efficiency of the radio channel resources of the BTSs.

SUMMARY OF THE INVENTION

Therefore, an object of the present invention provides a mobile communication repeating method for increasing the use efficiency of the radio channel resources of a BTS in a moving object and a repeater thereof.

Another object of the present invention provides a mobile communication repeating method in a moving object, for enabling efficient handoff between an MS in the mobbing object and a BTS and a repeater thereof.

A further object of the present invention provides a mobile communication repeating method in a moving object, for enabling multiple services of a plurality of mobile communication service providers and enabling efficient handoffs between an MS and a BTS of each mobile communication service provider and a repeater thereof.

In accordance with an aspect of the present invention, there is provided a repeater installed in a moving object, in which a link antenna module has a plurality of link antennas steered to predetermined directions, for wirelessly communicating with a BTS, a link antenna path setting module selects at least one of the plurality of link antennas of the link antenna module and connects a path between the selected link antenna and a rear end, a service antenna module has at least one service antenna installed within the moving object, for wirelessly communicating with MSs within the moving object, a relay signal processing module is connected to the link antenna module through the link antenna path setting module and processes transmission and reception relay signals between the link antenna module and the service antenna module, a movement information module measures current movement information about the moving object and provides the current movement information, a received signal measuring module measures a received signal of the link antenna module and provides current propagation environment information, and an antenna control module has an antenna selection controller for detecting a current movement state and a current propagation environment based on the information received from the received signal measuring module and the movement information module, storing and/or updating the information in an internal propagation environment information storage, selecting a serving BTS for each location based on the stored information, and controlling the link antenna path setting module to select a link antenna that receives the best signal from the selected BTS.

In accordance with another aspect of the present invention, there is provided a mobile communication repeating method in a moving object, in which a current movement state and a current propagation environment of the moving object are detected, information about the movement state and the propagation environment is stored and/or updated in a propagation environment information storage, a serving BTS is selected for each location based on the stored information and the information about the detected movement state and propagation environment, a direction in which the best signal is received from the selected BTS is determined, and at least one of the link antennas installed in each of a plurality of directions in the moving object for communication with BTSs is selected according to the determined direction.

As described above, the mobile communication repeating method in a moving object according to the present invention steers repeater antennas installed in the moving object to serving BTSs or the best reception directions to receive signals from the serving BTSs according to a plurality of service providers or selects antennas that are steered to the serving BTSs or the best reception directions to receive signals from the serving BTSs from among the repeater antennas. Therefore, signals from the serving BTSs are kept relatively strong, thereby decreasing the number of handoff occurrences between an MS and BTSs. The resulting decrease in redundant allocation of communication channels to a single MS by a plurality of neighbor BTSs enables an efficient handoff and increases the use efficiency of radio channel resources in BTSs.

DETAILED DESCRIPTION OF THE PREFERRED EMBODIMENT

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The following description is made in the context that a moving object to which the present invention is a bus, by way of example. A bus is a main moving object that can carry tens of passengers and move along a predetermined route at 60 km or so. Needless to say, the moving object to which the present invention may not take the predetermined moving path.

Assuming that all passengers of the bus are engaged in communications, a plurality of BTSs should allocate as many redundant channels to the passengers each time handoff occurs. As a result, radio channel resources are used inefficiently, which is to be solved by the present invention.

<Embodiment 1>

Figure 1:
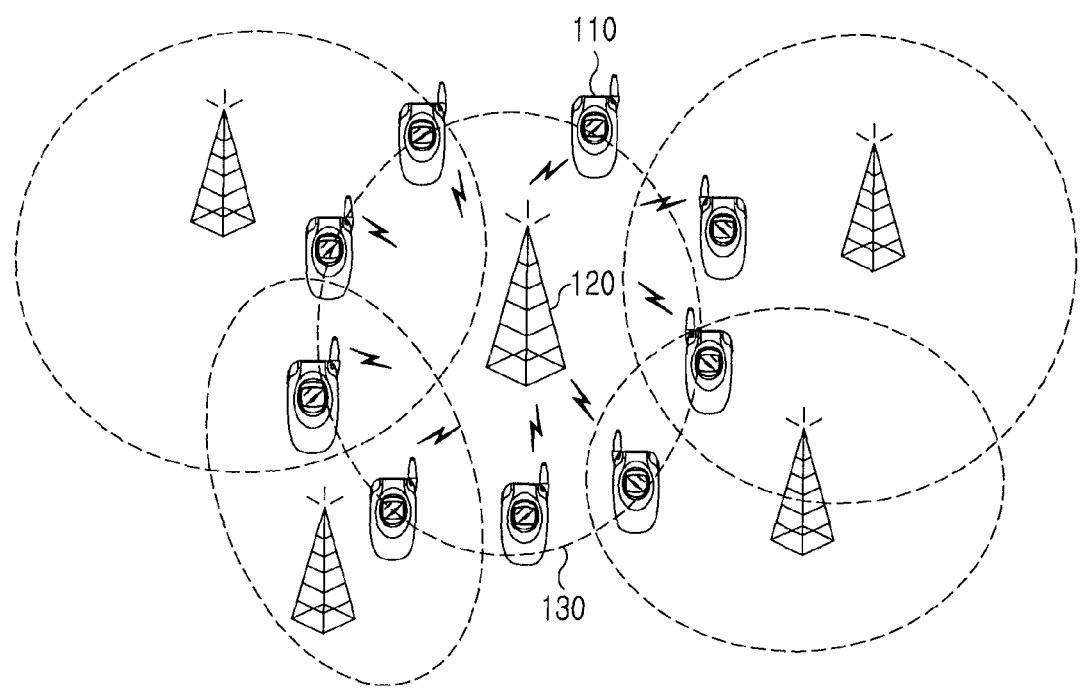
FIG. 1 illustrates the configuration of a mobile communication system to be referred for describing a general handoff.
Figure 2:
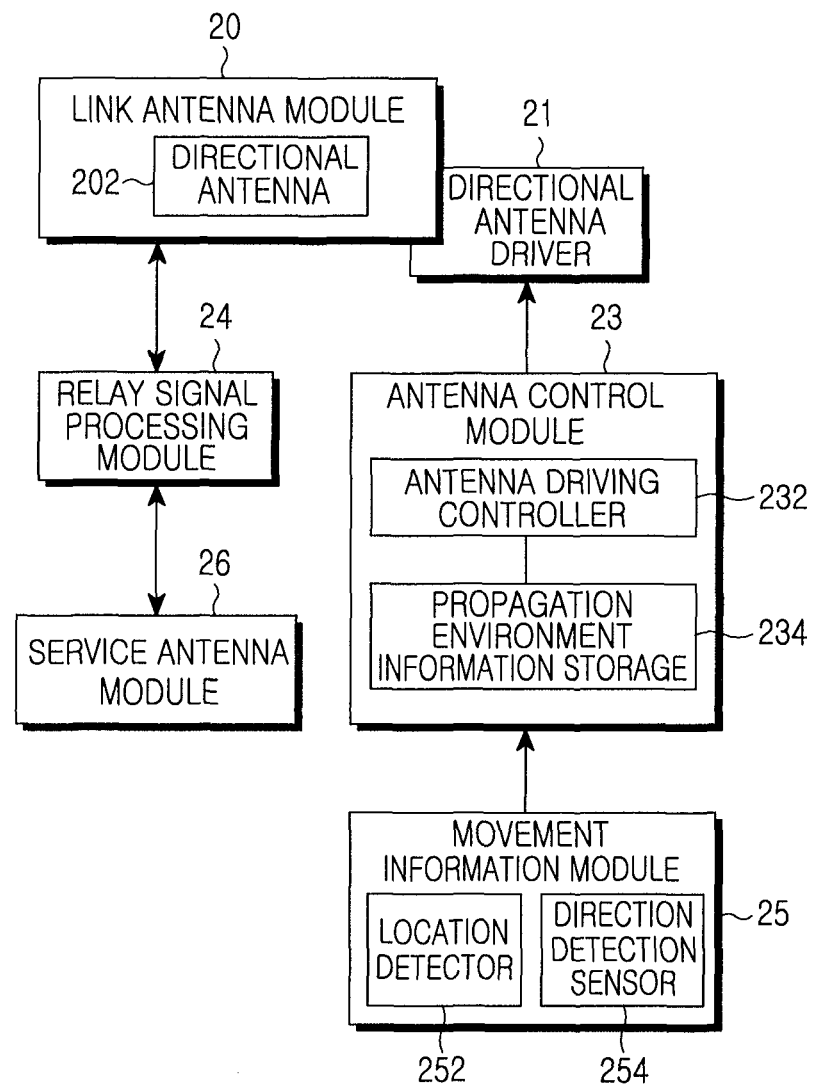
FIG. 2 is a block diagram of a repeater installed in a moving object according to an embodiment of the present invention.

FIG. 2 is a block diagram of a repeater installed in a moving object according to an embodiment of the present invention. Referring to FIG. 2, the repeater according to the embodiment of the present invention basically includes a link antenna module 20 for wireless communication with a BTS. The link antenna module 20 may includes at least one rotating directional antenna 202 for rotating mechanically or electrically, of which the direction can be controlled by a driver (directional antenna driver) 21.

The repeater further includes a relay signal processing module 24 for performing a typical wireless communication repeating operation. The relay signal processing module 24 filters and amplifies a signal received from the link antenna module to thereby compensate the signal to be receivable at an MS. The relay signal processing module 24 also filters and amplifies a signal received from an MS and outputs the amplified signal to a BTS through the link antenna module 20.

Wireless communication with MSs within a bus is conducted through a service antenna module 26. The service antenna module 26 is installed at an appropriate position within a moving object and connected to the relay signal processing module 24 by an RF cable. According to the propagation environment inside the moving object, various antennas usually used for indoor distribution equipment like leakage coaxial, Omni, and Patch can be adopted in the service antenna module 26.

The thus-constituted repeater further includes a movement information module 25 for acquiring movement information including the current location, traveling direction, and speed of the moving object and providing the movement information to an antenna control module 23 and the antenna control module for analyzing the received information and the propagation environment and outputting a control signal for adjusting the steering direction of the direction antenna 202 of the link antenna module 20 according to the present invention.

The movement information module 25 has a position detector 252 for locating the mobbing object. The position detector can be a Global Position System (GPS) device for detecting three-dimensional position information about the moving object by GPS-based wireless measurement. Or the position detector can be any other Location Based Services (LBS) device. To detect the traveling direction of the mobbing object, the movement information module 25 may further include a direction detection sensor 254 with a gyroscope and a compass. Meanwhile, the movement information module 25 can detect the traveling direction of the moving object using a GPS device alone. That is, the movement information module 25 can detect the traveling direction of the moving object by analyzing the position displacement of the moving object over time. In this case, the movement information module 25 can be without the direction detection sensor 254.

The antenna control module 23 is provided with a propagation environment storage 234 for storing information about the propagation environment of a predetermined area (e.g. an area covering the movement path of the bus) as propagation map data in a database. The antenna control module 23 detects the current location, the traveling direction, and the speed of the moving object based on information received from the movement information module 25, determines a direction in which a signal from the BTS is received best at the current location and direction according to the propagation environment information stored in the propagation environment information storage 234. Therefore, the antenna control module 23 includes an antenna driving controller 232 for outputting a control signal to the directional antenna driver 21 in order to adjust the steering direction of the directional antenna 202 of the link antenna module 20.

The propagation environment information stored in the propagation environment information storage 234 includes information about BTSs of which the signal strengths are measured at each position, direction information about the BTSs, and information about the best direction of a signal from a BTS. A service provider that provides the present invention can preliminarily measure a propagation environment and make a propagation map by use of measurement equipment. Information about the propagation map can be stored in advance in the propagation environment information storage 234 of the wireless communication repeater of the present invention.

The repeater having the above-described configuration according to the present invention acquires movement information such as the current location and traveling direction of the bus and information about the position and best reception direction of a serving BTS stored in the propagation map, when the bus moves. Then, the repeater compares the current position and traveling direction of the bus with the position and best reception direction of the BTS and adjusts the steering direction of the antenna to receive a signal from the serving BTS reliably. The antenna direction adjustment can be performed in real time.

The antenna direction can be adjusted according to a predetermined program so that the antenna can be steered to the serving BTS or to a direction which the repeater can receive a signal best from the serving BTS.

Therefore, no matter what direction the bus goes to, the link antenna of the repeater is steered to the serving BTS or the best reception direction of the serving BTS. Since the signal from the serving BTS received at the repeater is maintained relatively strong through the antenna direction adjustment, the number of handoff occurrences with BTSs decreases. The resulting decrease in the number of BTSs that redundantly allocate channels to an MS during handoff leads to the increase of the use efficient of radio channel resources of each BS and reduces call loss caused by unnecessary reconnections and retransmissions that can be generated during frequent handoffs.

<Embodiment 2>

Figure 3:
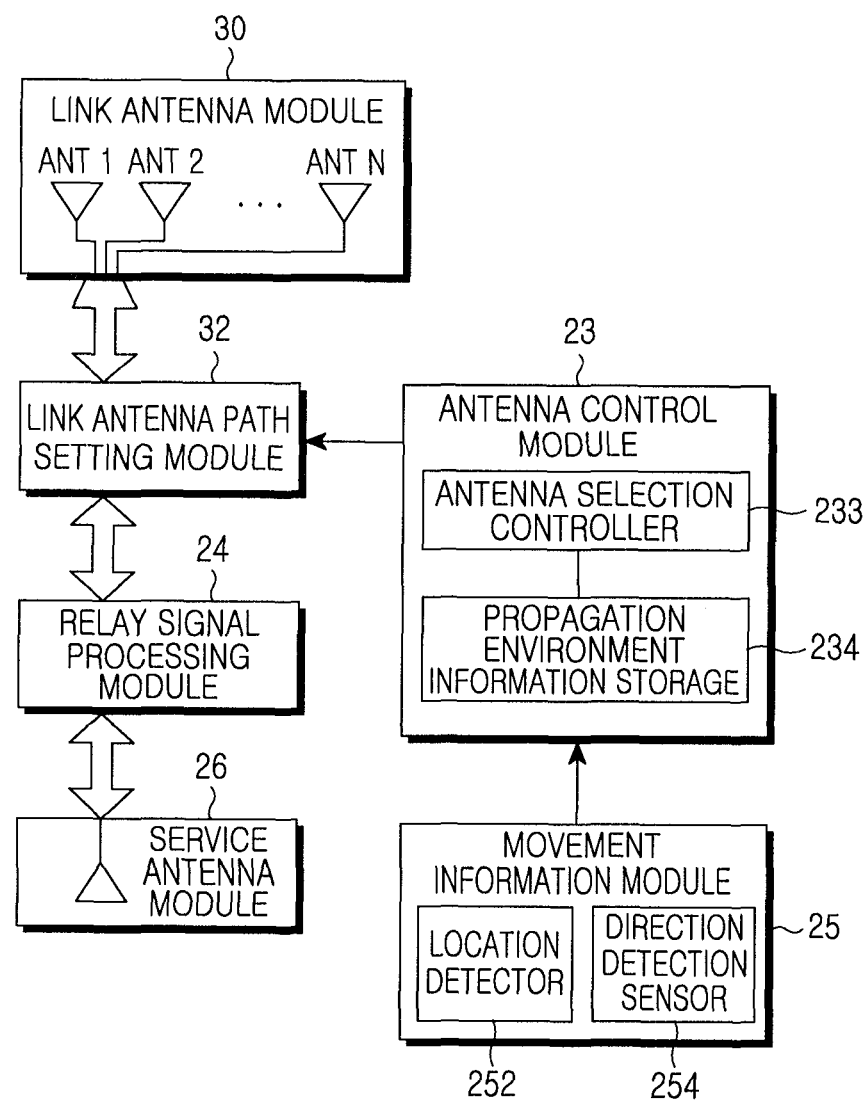
FIG. 3 is a block diagram of a repeater installed in a moving object according to another embodiment of the present invention.

FIG. 3 is a block diagram of a repeater installed in a moving object according to another embodiment of the present invention. Referring to FIG. 3, like the first embodiment of the present invention illustrated in FIG. 2, the repeater according to the second embodiment of the present invention includes a link antenna module 30 for wireless communication with a BTS, the relay signal processing module 24 for performing a typical wireless communication repetition operation, and the service antenna module 26 for wirelessly communicating with MSs within a moving object.

The link antenna module 30 may have a plurality of fixed antennas ANT1, ANT2, . . . , ANTN, compared to the first embodiment of the present invention illustrated in FIG. 2. For example, the link antenna module 30 can have four fixed antennas and be installed in the directions of East, West, South and North. Or the link antenna module 30 may have more antennas and be installed in more directions.

The repeater further includes a link antenna path setting module 32 for selecting at least one of the fixed antennas ANT1, ANT2, . . . , ANTN and connecting a path between the selected fixed antenna and the following relay signal processing module 24. The link antenna path setting module 32 may have a simple N:1 switch structure for selecting one of a plurality of antenna paths or an N:1 multi-selection switch structure for selecting one or more of a plurality of antenna paths and outputting one output.

Also, the repeater includes the movement information module 25 for acquiring information including the current location, traveling direction, and speed of the moving object and the antenna control module 23 for analyzing the information received from the movement information module 25 and a current propagation environment and outputting a control signal for selecting a particular antenna to the link antenna path setting module 32.

As in the first embodiment of the present invention illustrated in FIG. 2, the movement information module 25 may include the position detector 252 and the direction detection sensor 254. The antenna control module 23 may also include the propagation environment storage 234 for storing information about the propagation environment of a predetermined area as propagation map data in a database. Compared to the first embodiment of the present invention, the antenna control module 23 detects the current location, the traveling direction, and the speed of the moving object based on information received from the movement information module 25, determines the best reception direction of a signal from the BTS at the current location and direction according to the propagation environment information stored in the propagation environment information storage 234. Therefore, the antenna control module 23 includes an antenna selection controller 233 for outputting a control signal to the link antenna path setting module 32 in order to select an appropriate antenna from among the antennas of the link antenna module 30.

The repeater having the above-described configuration according to the second embodiment of the present invention acquires movement information such as the current location and traveling direction of the bus and information about the position and best reception direction of a serving BTS stored in the propagation map, when the bus moves. Then, the repeater compares the current position and traveling direction of the bus with the position and best reception direction of the BTS and selects an antenna for receiving a signal best from the serving BTS.

During the link antenna selection, an antenna steering to the serving BS or the best reception direction of the serving BS can be selected according to a predetermined program.

<Embodiment 3>

Figure 4:
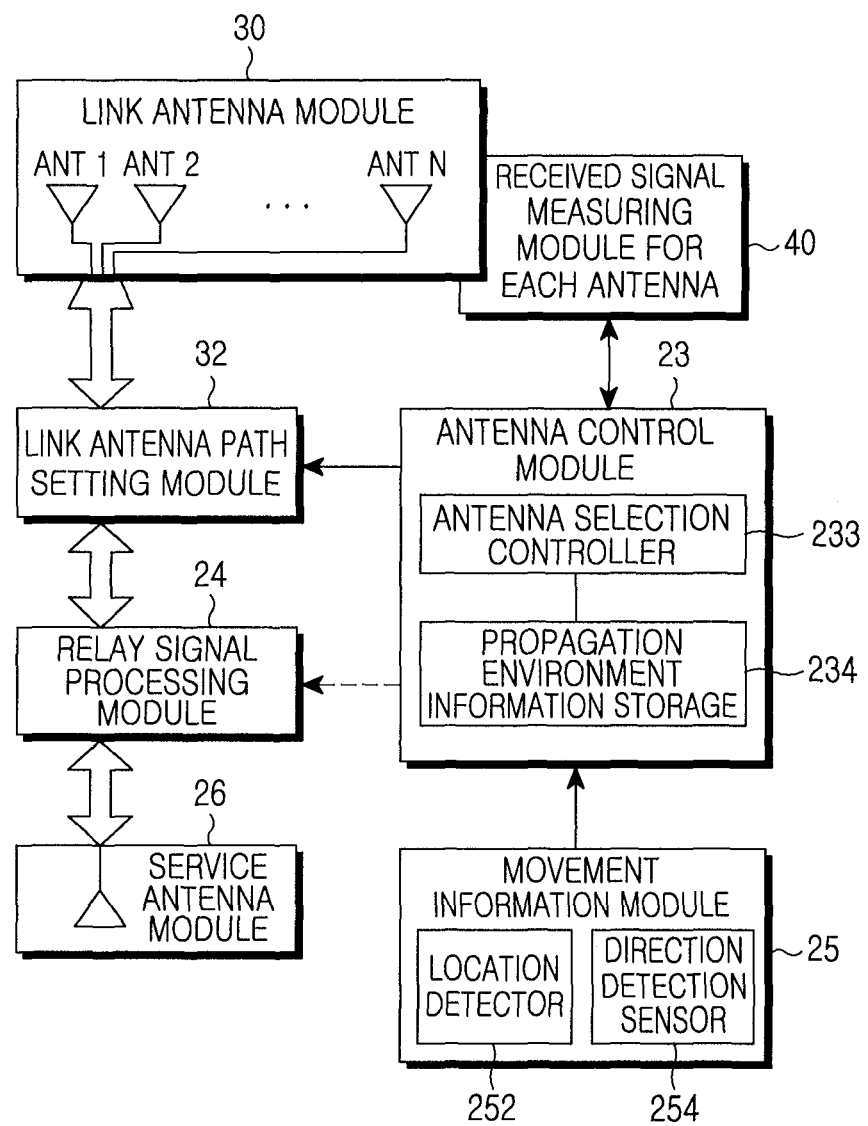
FIG. 4 is a block diagram of a repeater installed in a moving object according to a third embodiment of the present invention.

FIG. 4 is a block diagram of a repeater installed in a moving object according to a third embodiment of the present invention. Referring to FIG. 4, like the second embodiment of the present invention illustrated in FIG. 3, the repeater according to the third embodiment of the present invention includes the link antenna module 30 for wireless communication with a BTS, the relay signal processing module 24 for performing a typical wireless communication repetition operation, and the service antenna module 26 for wirelessly communicating with MSs within the moving object.

As in the second embodiment of the present invention, the link antenna module 30 may have a plurality of fixed antennas ANT1, ANT2, . . . , ANTN and the repeater further includes the link antenna path setting module 32 for selecting at least one of the fixed antennas ANT1, ANT2, . . . , ANTN and connecting a path between the selected fixed antenna and the following relay signal processing module 24.

Also, the repeater includes the movement information module 25 for acquiring information including the current location, traveling direction, and speed of the moving object and the antenna control module 23 for analyzing the information received from the movement information module 25 and a current propagation environment and outputting a control signal for selecting a particular antenna to the link antenna path setting module 32.

In the third embodiment of the present invention illustrated in FIG. 4, the repeater further includes a component for measuring a signal received at each antenna of the link antenna module 30, collecting current propagation environment information based on the signal measurements, and performing an appropriate operation adaptively according to the current propagation environment.

That is, as illustrated in FIG. 4, the repeater includes a received signal measuring module 40 for measuring the strengths of signals received from BTSs at each ANT. The antenna control module 40 determines the current propagation environment based on received signal detection information for each antenna received from the received signal measuring module 40 and performs a control operation for selecting an appropriate antenna, taking into account the current propagation environment additionally.

For example, although it is determined that the best signal is received from the serving BS at the first antenna ANT1 according to propagation environment information stored in the propagation environment information storage 234, the second antenna ANT2 can be selected if the signal received from the serving BTS at the second antenna is best under the current propagation environment according to the received signal detection information. The current propagation environment information can be stored in the propagation environment information storage 234 or used to update the stored information.

As described above, the repeater illustrated in FIG. 4 according to the third embodiment of the present invention can measure the current propagation environment through the received signal measuring module 40. Therefore, the repeater can adaptively cope with changes in the propagation environment such as topography or weather.

Because the repeater can also detect the real propagation environment, there is no need for preliminarily storing propagation environment information in the propagation environment information storage 234 of the antenna control module 23. That is, when there is no stored information about the propagation environment of a corresponding location according to the movement of the moving object, information about the propagation environment of each location can be stored for future use. For instance, when a bus initially runs along a corresponding route, information about a real propagation environment is measured and stored in the propagation environment information storage 234. When the bus moves later along the corresponding route, the previous stored propagation environment information can be used.

Figures 10, 11:
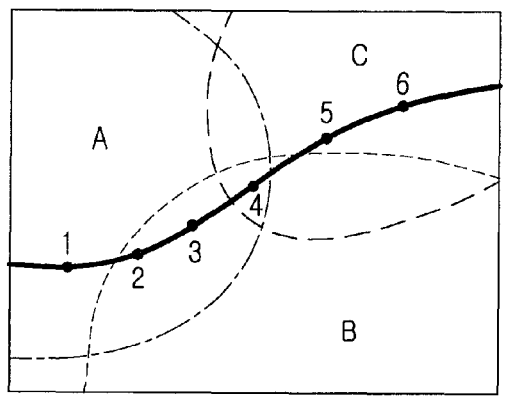
FIG. 10 is an exemplary view illustrating a moving path of a moving object and BTS service areas in which the moving path runs.
FIG. 11 illustrates exemplary propagation environment information stored in a propagation environment information storage according to an embodiment of the present invention.

With reference to FIGS. 10 and 11, the propagation environment information stored in the propagation environment information storage 234 and the operation of storing the propagation environment information will be described in more detail. FIG. 10 is an exemplary view illustrating a moving path of a moving object and BTS service areas in which the moving path runs and FIG. 11 illustrates exemplary propagation environment information that can be stored in the propagation environment information storage 234 in this state. In the case of FIG. 10, the service areas of BTSs A, B and C are shown to be distinctively distinguished from one another and marked with dotted lines or dashed dot lines, for illustrative purpose. It is to be noted that in a real environment, the boundaries between the service areas are not distinctive.

As illustrated in FIG. 10, assuming that the moving object travels along the path of 1→2→3→4→5→6 over time, the propagation environment information can be the strength and energy-to-interference ratio (Ec/Io) of each link antenna according to locations and directions, as illustrated in FIG. 11. For example, the moving object moves in the direction of "→" at location 1 and can receive only a signal from BTS A at a corresponding location. Therefore, information about signals received at the plurality of link antennas ANT1 to ANTN is about pilot signals from BTS A only. In this case, information about the strength and Ec/Io of a pilot signal from BTS A at each antenna can be stored. Obviously, at least part of the plurality of link antennas ANT1 to ANTN can receive a signal from BTS B or BTS C at location 1 in a real environment. Then, information about signals received from all of such BTSs can be stored.

Meanwhile, at location 4 where the service areas of BTSs A, B and C overlap, the moving object travels along the direction of "↗" and can receive pilot signals from all of BTSs A, B and C at the plurality of link antennas ANT1 to ANTN. In this case, the strength and Ec/Io information of a pilot signal from each BTS can be stored. Information about the location and direction of the moving object is stored based on information provided by the movement information module 25.

The above method for selecting an appropriate antenna based on propagation environment information that can be stored in the propagation environment information storage 234 by the antenna control module 23 will be detailed below. In accordance with the present invention, the antenna control module 23 can distinguish the service area of each BTS based on information stored in the propagation environment information storage 234 and controls the link antenna path setting module 32 to select a link antenna corresponding to a direction in which the best signal is received from the serving BTS at each location. Herein, the service areas of BTSs are defined such that the change of the serving BTS is minimized during movement.

For example, when the moving object travels along the path of 1→2→3→4→5→6 over time as illustrated in FIG. 10, BTS A is selected at locations 1, 2, 3 and 4 and an antenna is selected, which receives the best signal from BTS A. At locations 5 and 6, an antenna that can receive the best signal from BTS C can be selected.

Although a signal received from BTS B can be stronger than a signal received from BTS A at locations 2, 3 and 4 where the service areas of BTSs A and B overlap, an antenna that receives the best signal from BTS A is selected in order to prevent frequent handoffs. As in this case, an MS may receive a signal under a special propagation environment, that is, it may receive a weaker signal from a physically nearby BTS than from a remote BTS due to topography. In this case, if the MS moves out of the corresponding area, it will receive a strong signal from the nearby BTS. In the present invention, a signal is received from the nearby BTS with as good a quality as possible rather than a strong signal is selected indiscriminately, thereby causing frequent handoffs. The resulting decrease in the number of handoff occurrences between a BTS and the MS reduces redundant channel allocation of a plurality of BTSs. In this manner, when the service area of each BTS is distinguished in the case of FIG. 10, the serving BTS A is changed directly to BTS C without being changed to BTS B (or without changing from BTS A to BTS B and then to BTS A) in order to reduce the number of changes of the serving BTS.

Meanwhile, even in the case where even though the strength of a signal from BTS B is the largest at locations 2, 3 and 4, an antenna that receives the best signal from BTS A is selected to reduce the number of handoff occurrences, an antenna that receives the best signal from BTS B at locations 2, 3 and 4 can be selected, taking into account the current velocity (the displacement) of the moving object. That is, if the bus being the moving object stays for relatively long at locations 2, 3 and 4 due to traffic congestion (that is, the moving object is slower than a predetermined velocity), a BTS (i.e. BTS B) from which the MS receives the strongest signal at its current location can be selected, taking into account the quality of service of the signal.

<Detailed Example 1 of Embodiment 3>

Figure 5:
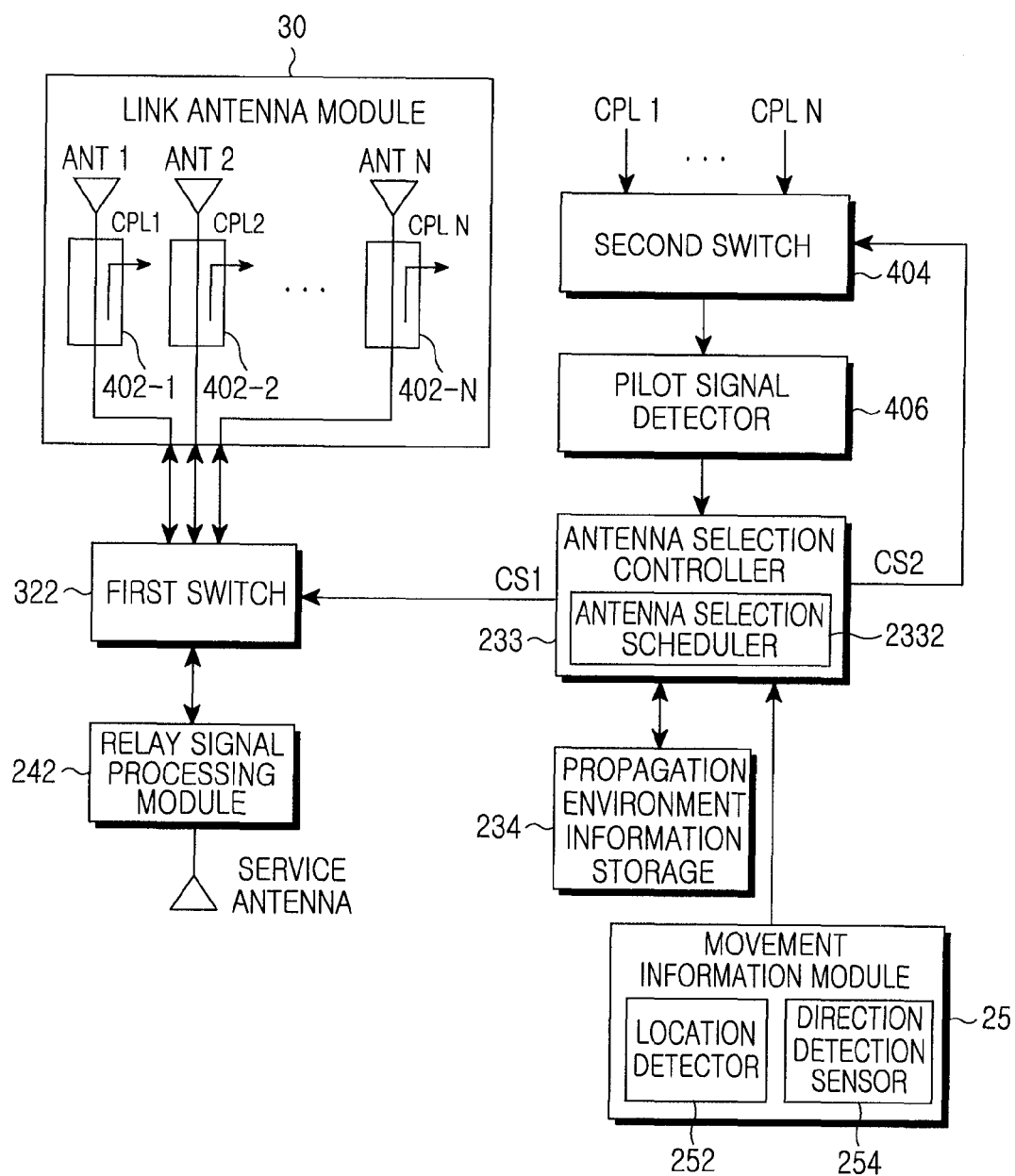
FIG. 5 is an exemplary detailed block diagram of the third embodiment of the present invention.

FIG. 5 is an exemplary detailed block diagram of the third embodiment of the present invention. Referring to FIG. 5, compared to the repeater illustrated in FIG. 4 according to the third embodiment of the present invention, the link antenna module 32 includes a first switch 322 of an N:1 multi-selection switch structure, for switching according to a control signal CS1 received from an antenna selection controller 233. The relay signal processing module 24 and the service antenna module 26 illustrated in FIG. 4 include a relay signal processor 242 and a service antenna 262, respectively.

Also, the received signal measuring module 40 illustrated in FIG. 4 includes a plurality of couplers 402-1 to 402-N, a second switch 404, and a pilot signal detector 406. The couplers 402-1 to 402-N are provided at the plurality of antennas ANT1 to ANTN of the link antenna module 30 in a one to one correspondence, for coupling signals received at their corresponding antennas and outputting the coupled signals CPL1 to CPLN to the second switch 404.

The second switch 404 can be a general N:1 switch. It outputs one of the received signals CPL1 to CPLN according to a scan control signal CS2 received from the antenna selection controller 233. This operation is for controlling the second switch 404 to sequentially select the received signals one by one. Hence, the signals received at the plurality of link antennas are sequentially scanned.

The pilot signal detector 406 detects the strength of a pilot signal from each BTS from among the received signals of the antennas sequentially output from the second switch 404 and provides it to the antenna selection controller 233.

Meanwhile, the antenna selection controller 233 stores and updates information about a signal received at each link antenna for each location of the moving object, received from the pilot signal detector 406. To select an appropriate antenna for a corresponding location based on the corresponding information and the stored information, the antenna selection controller 233 has an antenna selection scheduler 2332 for performing a corresponding function.

<Detailed Example 2 of Embodiment 3>

Figure 6:
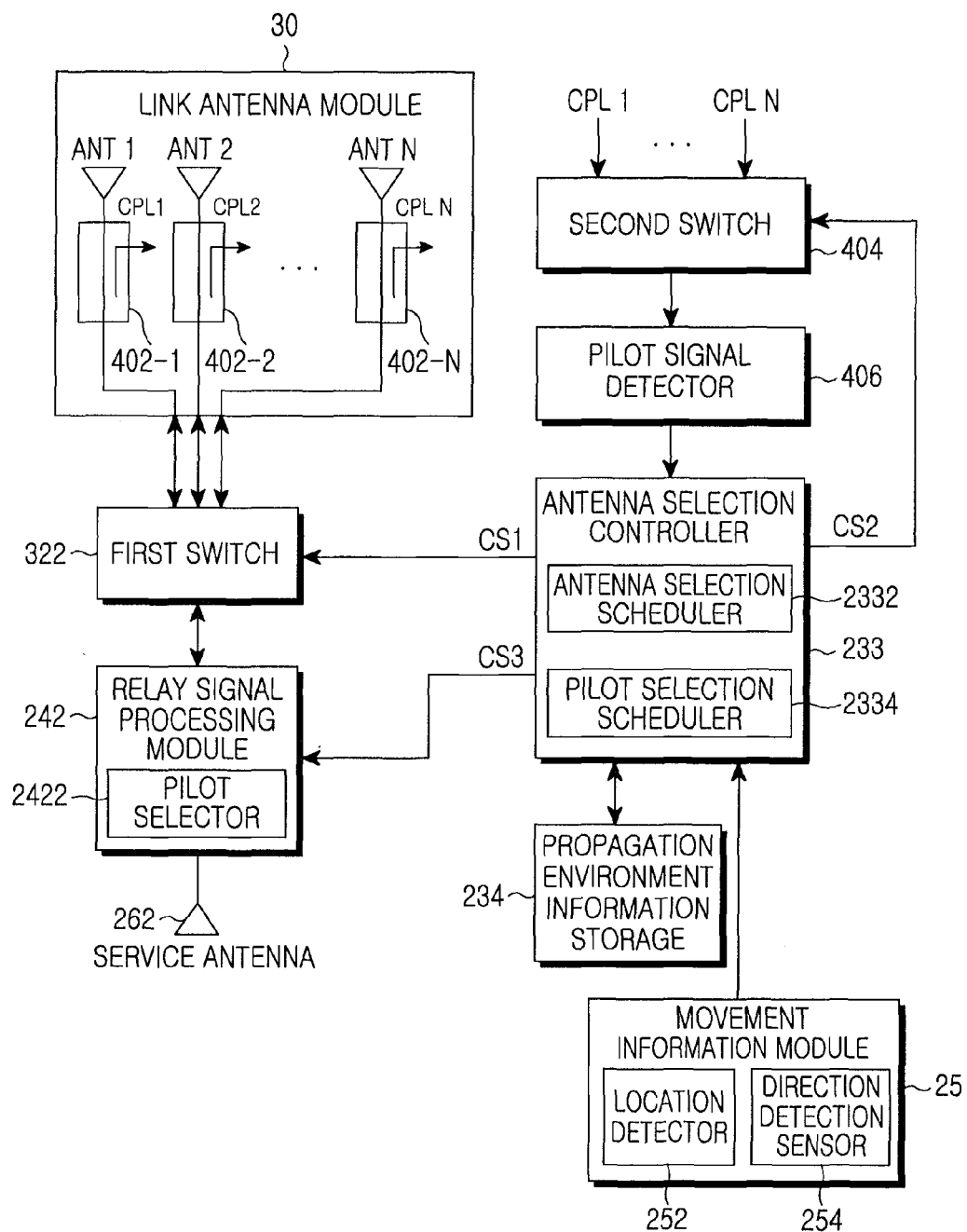
FIG. 6 is another exemplary detailed block diagram of the third embodiment of the present invention.

FIG. 6 is another exemplary detailed block diagram of the third embodiment of the present invention. Referring to FIG. 6, compared to the first detailed example of the third embodiment of the present invention illustrated in FIG. 5, the relay signal processor 242 includes a pilot selector 2422 and the antenna selection controller 232 is provided with a pilot selection scheduler 2334.

The pilot selector 2422 of the relay signal processor 242 selects one of a plurality of pilot signals according to a control signal CS3 received from the antenna selection controller 232. The pilot selector 2422 may have a configuration for amplifying only a desired pilot signal or eliminating the other pilot signals. Or it can have the configuration of a typical pilot canceller.

The pilot selection scheduler 2334 of the antenna selection controller 233 is additionally provided to select only a pilot signal received from a selected BTS based on appropriate BTS selection information for each moving object location. It identifies the pilot signal of the selected BTS and outputs the control signal CS3 to the pilot selector 2422 in order to select only the pilot signal of the selected BTS.

Owing to the configurations of the pilot selection scheduler 2334 and the pilot selector 2422, only the pilot signal of the selected BTS is selected or the other pilot signals are eliminated. Even though a single antenna is selected, signals can be received from other BTSs than a desired BTS at a corresponding antenna. Under circumstances, a signal from some other BTS can be stronger than a signal from the desired BTS. This other BTS interference problem is solved and only a desired pilot signal is selected. Therefore, the probability of the MS's handoff to other BTSs than the selected BTS is reduced.

<Detailed Example 3 of Embodiment 3>

Figure 7:
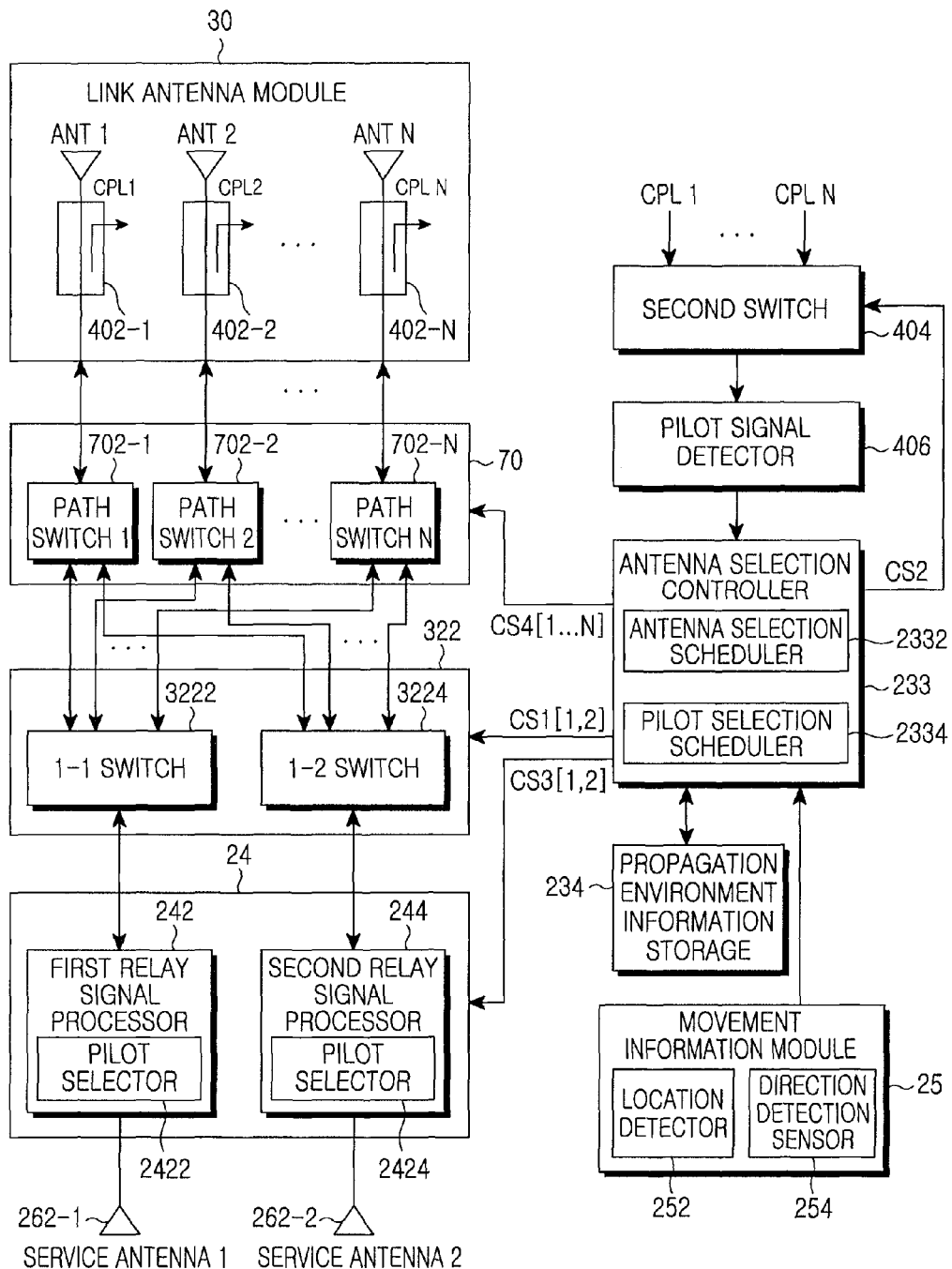
FIG. 7 is a third exemplary detailed block diagram of a fourth embodiment of the present invention.

FIG. 7 is a third exemplary detailed block diagram of the third embodiment of the present invention. Referring to FIG. 7, compared to the previous detailed examples of the third embodiment of the present invention, the relay signal processing module 24 includes first and second relay signal processors 242 and 244 having the same structure. In addition, the first switch 322 as illustrated in FIG. 4 has switches 3222 and 3224 for the respective first and second relay signal processors 242 and 244. First and second service antennas 262-1 and 262-2 are also provided for the respective first and second relay signal processors 242 and 244.

A path switching portion 70 is provided to switch paths of the plurality of antennas ANT1 to ANTN to the switch 3222 or 3224 according to a control signal CS4 for path switching received from the antenna selection controller 233. The path switching portion 70 includes path switches 702-1 to 702-N having a 2:1 switch structure, each for one antenna path. The control signal CS4 is individually provided to the path switches 702-1 to 702-N, for a different switching operation of each path switch.

The switches 3222 and 3224 form the first switch 322 having the same N:1 multi-selection switch structure. The switch 3222 is connected to one switching paths of the path switches 702-1 to 702-N and switches multi-selectable paths among them to the first relay signal processor 242. The switch 3224 is connected to the other switching paths of the path switches 702-1 to 702-N and switches multi-selectable paths among them to the second relay signal processor 242. The switching control signal CS1 is individually provided to the switches 3222 and 3224, for a different switching operation of each switch.

The path switches 702-1 to 702-N switch all paths to the switch 3222. When the switch 3222 performs an appropriate switching operation for antenna selection, the first relay signal processor 242 may operate in a similar manner to the antenna selections of FIGS. 4, 5 and 6. In the third detailed example of the third embodiment of the present invention, another antenna is selected through the second relay signal processor 244 and a relay operation using the selected antenna occurs simultaneously.

For instance, when the switch 322 selects a first antenna ANT1, the other path switches 702-2 except the path switch 702-1 can be controlled to switch paths to the switch 3224. The switch 3224 selects an appropriate antenna, for example, a second antenna ANT2 from among the other antennas except the first antenna ANT1 according to a control signal CS1[2]. Thus, the second relay signal processor 244 performs a relay signal processing operation through the second antenna ANT2.

As described above, the switch 3224, the path switching portion 70, and the second relay signal processor 214 can select a desired antenna from among the remaining antennas except one or more antennas selected by the switch 3222 and the first relay signal processor 212. This function can be performed appropriately according to handoff or the location and call environment of the mobbing object.

It is obvious that the first and second relay signal processors 242 and 244 can different antennas for different BTSs. As illustrated in FIG. 7, the first and second relay signal processors 242 and 244 may have pilot selectors 2422 and 2424, respectively. Then the pilot selection scheduler 2334 of the antenna selection controller 233 controls the pilot selection operations of the pilot selectors 2422 and 2424 individually.

<Embodiment 4>

Figure 8:
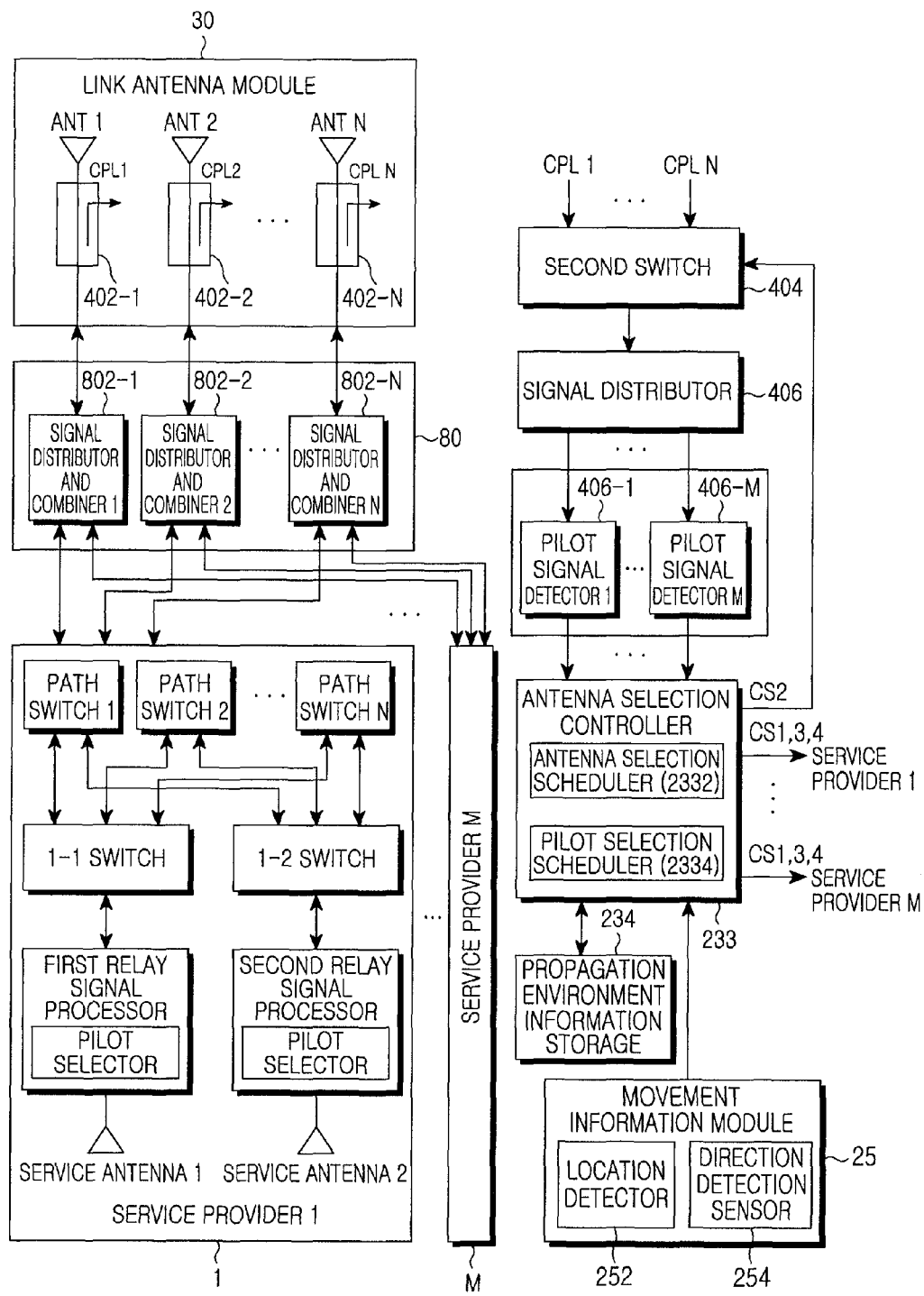
FIG. 8 is a block diagram of a repeater installed in a moving object according to the third embodiment of the present invention.

FIG. 8 is a block diagram of a repeater installed in a moving object according to a fourth embodiment of the present invention. Referring to FIG. 8, the repeater according to the fourth embodiment of the present invention basically includes a plurality of (M) link antenna path setting modules 32, a plurality of (M) relay signal processing modules 24, and a plurality of (M) service antenna modules 26 for as many service providers, compared to the repeater according to the third embodiment of the present invention. In the illustrated case of FIG. 8, the third detailed example of the third embodiment of the present invention illustrated in FIG. 7 is redundantly provided. Hereinafter, a configuration for each service provider will be collectively referred to as "per-service provider system".

The link antenna module 30 is shared among the service provides. A signal distribution and combination portion 80 is provided to distribute and combine paths between the per-service provider systems and the antennas ANT1 to ANTN. The signal distribution and combination portion 80 includes signal distributors and combiners 802-1 to 802-M, each for one antenna path. Each signal distributor and combiner distributes a signal received at a corresponding antenna to the per-service provider systems. It also combines signals received from the per-service provider systems and provides the combined signal to the corresponding antenna.

Similarly to the configuration according to the third embodiment of the present invention, for measuring a signal received at each antenna, the repeater according to the fourth embodiment of the present invention is also configured so that the couplers 402-1 to 402-N provide coupling signals CPL1 to CPLN of signals received at the plurality of antennas ANT1 to ANTN to the second switch 404 and the second switch 404 outputs one of the received signals CPL1 to CPLN according to a control signal CS2 received from the antenna selection controller 233. In the fourth embodiment of the present invention, the repeater further includes a signal distributor 406 for providing the signal received from the second switch 404 to pilot signal detectors 406-1 to 406-M. The antenna selection controller 233 receives the outputs of the pilot signal detectors 406-1 to 406-M, detects the received signal of each antenna for each service provider, and provides control signals CS1, CS3 and CS4 to the per-service provider systems in order to select an appropriate antenna for each service provider. In this case, the antenna selection controller 233 analyzes the received signal of each antenna on a service provider basis and stores propagation environment information for each service provider in the propagation environment information storage 234.

As described above, the mobile communication repeating method in a moving object and the configuration and operation of a repeater according to embodiment of the present invention are provided.

Figure 9:
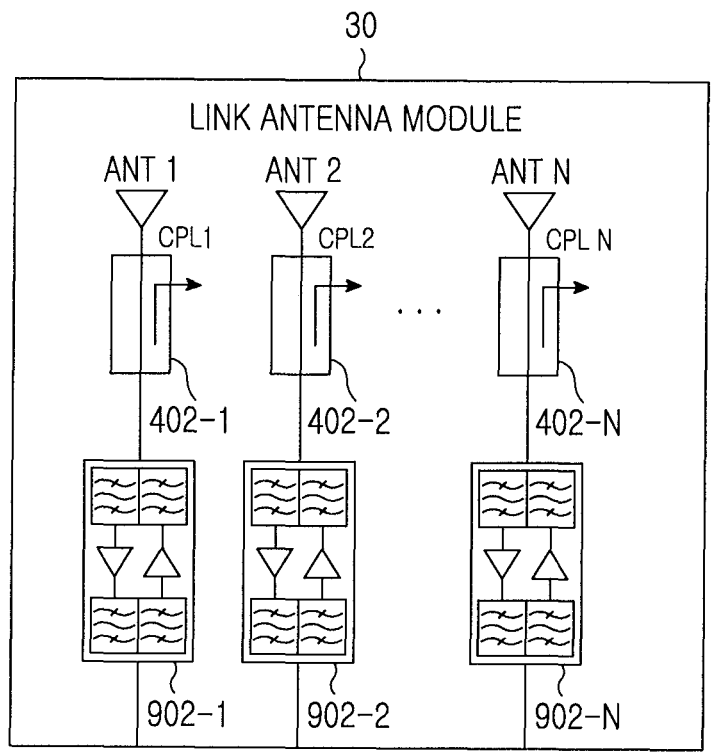
FIG. 9 is a block diagram of a link antenna module according to a further embodiment of the present invention.

While the invention has been shown and described with reference to certain embodiments of the present invention thereof, it will be understood by those skilled in the art that various changes in form and details may be made therein without departing from the spirit and scope of the present invention as defined by the appended claims and their equivalents. For example, each of the plurality of fixed antennas ANT1 to ANTN in the link antenna module 30 may have one line booster, as illustrated in FIG. 9. The line boosters 902-1 to 902-N compensate loss to the relay signal processing module by improving the reception sensitivity of signals received at corresponding antennas and compensate signals transmitted through the corresponding antennas.

Also as in the second detailed example of the third embodiment of the present invention illustrated in FIG. 6, the pilot selection scheduler 2334 of the antenna selection controller 233 for selecting a pilot signal of a corresponding serving BTS and the pilot selector 242 of the relay signal processor 242 can be provided in the antenna selection controller 233 and the relay signal processing module 24, respectively in the second embodiment of the present invention illustrated in FIG. 3. The configuration of FIG. 3 is for selecting a serving BS and an appropriate antenna based on information stored in the propagation environment storage 234, not for measuring current received signals in real time. Even in this case, the configuration for selecting the pilot signal of the serving BTS can be further provided.

While it has been described that when a system is configured on a service provider basis as illustrated in FIG. 8, the link antenna module 30 is shared among service providers, a link antenna module can be provided for each service provider. Then, the components including the link antenna modules according to the third embodiment of the present invention can be provided for each service provider.

The antennas ANT1 to ANTN of the link antenna module 30 can be appropriately installed to be steered in different directions and to have different beam patterns in order to perform feature functions of the present invention reliably. For example, left and right antennas of the moving object (with respect to a road) may have a wide beam pattern in an open area with a relatively small number of BTSs unlike a densely BTS-populated downtown area. This beam pattern can be formed by adjusting the numbers of the columns of radiation devices arrayed on the radiation plates of the corresponding antennas. In addition, while it has been described that a plurality of antennas are selected through the first switch 322 according to the embodiment of the present invention, it can be further contemplated that when two or more antennas are commonly selected, the beam patterns of the antennas are combined and thus a different beam pattern from that of each antenna is formed. That is, when a plurality of antennas are commonly selected, a beam pattern can be widened in some cases.

Also, while it has been described that the plurality of link antennas ANT1 to ANTN in the link antenna module 30 are fixed according to the third embodiment of the present invention, each antenna can be configured to be rotatable through a driver, like the antennas according to the third embodiment of the present invention. In this case, the antenna control module can change the reception direction of each antenna by appropriately controlling a corresponding driver.

While it has been described that the propagation environment information stored in the propagation environment information storage 234 include BTS information for each received signal strength at each location, direction information of BTSs, and best signal reception information about the BTSs in the first and second embodiments of the present invention, the repeater can be configured so as to steer link antennas in the directions set for corresponding locations according to a current set program. Then only information indicating an antenna to be selected for a corresponding location can be stored in the propagation environment information storage 234.

Also, while it has been described above that the antenna control module 23 is logically separated from the relay signal processing module 24 for notational simplicity, they can be configured to be a control device with a CPU and a hardware device, for signal repetition in the relay signal processing module 24.

While the repeater of the present invention has been described to communicate with a plurality of BTSs, it can also communicate with a fixed repeater.

As described above, various modifications can be made to the present invention. Therefore, it will be understood by those skilled in the art that various changes in form and details may be made therein without departing from the spirit and scope of the present invention as defined by the appended claims and their equivalents.

The invention claimed is:

1. A repeater installed in a moving object, comprising:
a link antenna module having a plurality of link antennas steered to predetermined directions, for wirelessly communicating with a Base Transceiver Station (BTS);
a link antenna path setting module for selecting at least one of the plurality of link antennas of the link antenna module and connecting a path between the selected link antenna and a rear end;
a service antenna module having at least one service antenna installed within the moving object, for wirelessly communicating with Mobile Stations (MSs) within the moving object;
a relay signal processing module connected to the link antenna module through the link antenna path setting module, for processing transmission and reception relay signals between the link antenna module and the service antenna module;
a movement information module for measuring current movement information about the moving object and providing the current movement information;
a received signal measuring module for measuring a received signal of the link antenna module and providing current propagation environment information; and
an antenna control module having an antenna selection controller for detecting a current movement state and a current propagation environment based on the information received from the received signal measuring module and the movement information module, storing and/or updating the information in an internal propagation environment information storage, selecting a serving BTS for each location based on the stored information, and controlling the link antenna path setting module to select a link antenna that receives the best signal from the selected BTS.

2. The repeater of claim 1, wherein the movement information module detects the location and direction of the moving object.

3. The repeater of claim 1, wherein the link antenna path setting module has one of an N:1 switch structure for selecting one of paths of the plurality of link antennas and an N:1 multi-selection switch for selecting two or more of the paths of the plurality of link antennas and outputting one output in the selected paths.

4. The repeater of claim 1, wherein the information stored and/or updated in the propagation environment information storage includes the strength of a pilot signal at each link antenna according to each location and each direction.

5. The repeater of claim 1, wherein the link antenna module includes a line booster for each of the plurality of link antennas, for compensating loss to the relay signal processing module by improving the reception sensitivity of a signal received at a corresponding antenna and compensating a signal transmitted through the corresponding antenna.

6. The repeater of claim 1, wherein the plurality of link antennas in the link antenna module are rotatable antennas that can be rotated for adjustment of a reception direction by a driver.

7. The repeater of claim 1, wherein the received signal measuring module comprises:
a plurality of couplers each for one of the link antennas, for coupling a signal received at a corresponding link antenna and outputting the coupled signal;
a second switch being an N:1 switch, for selecting one of signals output from the plurality of couplers according to a scan control signal received from the antenna selection controller; and
a pilot signal detector for detecting the strength of a pilot signal from each BTS from received signals of the link antennas sequentially output from the second switch and providing the strength to the antenna selection controller, wherein the antenna selection controller selects the signals received from the second switch one by one to sequentially scan the received signals of the respective link antennas.

8. The repeater of any of claims 1 to 7, wherein the relay signal processing module comprises a pilot selector for processing only a pilot signal selected from among a plurality of pilot signals according to a pilot selection control signal received from the antenna selection controller, and the antenna selection controller comprises a pilot selection scheduler for selecting only a pilot signal of a selected BTS based on BTS selection information for each location of the moving object, identifying the pilot signal of the selected BTS, and outputting the pilot selection control signal to the pilot selector, for selection of the pilot signal of the selected BTS only.

9. The repeater of any of claims 1 to 7, wherein the relay signal processing module comprises first and second relay signal processors having the same configuration, for processing a relay signal, the service antenna module comprises service antennas, one for each of the first and second relay signal processors, the link antenna path setting module comprises 1-1 and 1-2 switches provided for the respective relay signal processors, for operating according to a switching control signal received from the antenna selection controller and a path switching portion for switching the individual paths of the plurality of link antennas to the 1-1 or 1-2 switch according to a path switching control signal received from the antenna selection controller, wherein the 1-1 and 1-2 switches have an N:1 multi-selection switch structure, the 1-1 switch is connected to one switching paths of the path switching portion and switches multi-selectable paths of the switching paths to the first relay signal processor, and the 1-2 switch is connected to the other switching paths of the path switching portion and switches multi-selectable paths of the switching paths to the second relay signal processor.

10. A repeater installed in a moving object, comprising:
a link antenna module having a plurality of link antennas steered to predetermined directions, for wirelessly communicating with a Base Transceiver Station (BTS);
a plurality of per-service provider systems each having apparatuses for a moving communication service provider;
a signal distribution and combination portion for distributing and combining paths of the link antennas of the link antenna module and connecting the distributed and combined paths to the plurality of per-service provider systems;
a movement information module for measuring current movement information about the moving object and providing the current movement information;
a received signal measuring module for measuring a received signal of the link antenna module and providing current propagation environment information for each service provider; and
an antenna control module having an antenna selection controller for detecting a current movement state and a current propagation environment based on the information received from the received signal measuring module and the movement information module, storing and/or updating the information in an internal propagation environment information storage, selecting a serving BTS for each location based on the stored information, and controlling the link antenna path setting module to select a link antenna that receives the best signal from the selected BTS,
wherein each of the per-service provider systems comprises:
a link antenna path setting module for selecting at least one of the plurality of link antennas of the link antenna module and connecting a path between the selected link antenna and a rear end;
a service antenna module having at least one service antenna installed within the moving object, for wirelessly communicating with Mobile Stations (MS s) within the moving object; and
a relay signal processing module connected to the link antenna module through the link antenna path setting module, for processing transmission and reception relay signals between the link antenna module and the service antenna module.

11. The repeater of claim 10, wherein the received signal measuring module comprises:
a plurality of couplers each for one of the link antennas, for coupling a signal received at a corresponding link antenna and outputting the coupled signal;
a second switch being an N:1 switch, for selecting one of signals output from the plurality of couplers according to a scan control signal received from the antenna selection controller;
a signal distributor for receiving the signal from the second switch and distributing the received signals into as many signals as the number of the per-service provider systems; and
a plurality of pilot signal detectors each for one service provider, for detecting the strength of a pilot signal from each BTS for each service provider from received signals of the link antennas output from the signal distributor and providing the strength to the antenna selection controller,
wherein the antenna selection controller selects the signals received from the second switch one by one to sequentially scan the received signals of the respective link antennas.

12. The repeater of one of claims 10 and 11, wherein in each per-service provider system, the relay signal processing module comprises a pilot selector for processing only a pilot signal selected from among a plurality of pilot signals according to a pilot selection control signal received from the antenna selection controller, and the antenna selection controller comprises a pilot selection scheduler for selecting only a pilot signal of a selected BTS based on BTS selection information for each location of the moving object, identifying the pilot signal of the selected BTS, and outputting the pilot selection control signal to the pilot selector, for selection of the pilot signal of the selected BTS only.

13. The repeater of one of claims 10 and 11, wherein in each per-service provider system, the relay signal processing module comprises first and second relay signal processors having the same configuration, for processing a relay signal, the service antenna module comprises service antennas, one for each of the first and second relay signal processors, the link antenna path setting module comprises 1-1 and 1-2 switches provided for the respective relay signal processors, for operating according to a switching control signal received from the antenna selection controller and a path switching portion for switching the individual paths of the plurality of link antennas to the 1-1 or 1-2 switch according to a path switching control signal received from the antenna selection controller,
wherein the 1-1 and 1-2 switches have an N:1 multi-selection switch structure, the 1-1 switch is connected to one switching paths of the path switching portion and switches multi-selectable paths of the switching paths to the first relay signal processor, and the 1-2 switch is connected to the other switching paths of the path switching portion and switches multi-selectable paths of the switching paths to the second relay signal processor.

14. A repeater installed in a moving object, comprising:
a link antenna module having a plurality of link antennas steered to predetermined directions, for wirelessly communicating with a Base Transceiver Station (BTS);
a link antenna path setting module for selecting at least one of the plurality of link antennas of the link antenna module and connecting a path between the selected link antenna and a rear end;
a service antenna module having at least one service antenna installed within the moving object, for wirelessly communicating with Mobile Stations (MSs) within the moving object;
a relay signal processing module connected to the link antenna module through the link antenna path setting module, for processing transmission and reception relay signals between the link antenna module and the service antenna module;
a movement information module for measuring current movement information about the moving object and providing the current movement information;
a received signal measuring module for measuring a received signal of the link antenna module and providing current propagation environment information; and
an antenna control module for detecting a current movement state based on the information received from the movement information module, selecting a serving BTS for each location based propagation environment information including information about BTS signals in each direction at each location, stored in an internal propagation environment information storage, and controlling the link antenna path setting module to select a link antenna that receives the best signal from the selected BTS.

15. The repeater of claim 14, wherein the relay signal processing module comprises a pilot selector for processing only a pilot signal selected from among a plurality of pilot signals according to a pilot selection control signal received from the antenna selection controller, and the antenna selection controller comprises a pilot selection scheduler for selecting only a pilot signal of a selected BTS based on BTS selection information for each location of the moving object, identifying the pilot signal of the selected BTS, and outputting the pilot selection control signal to the pilot selector, for selection of the pilot signal of the selected BTS only.

16. A mobile communication repeating method in a repeater installed in a moving object, comprising:

installing a plurality of link antennas steered to a predetermined direction in the moving object, for wirelessly communicating with a Base Transceiver Station (BTS);

detecting a current movement state and a current propagation environment of the moving object;

storing and/or updating information about the movement state and the propagation environment in a propagation environment information storage;

selecting the BTS for each location based on the stored information and the information about the detected movement state and propagation environment and determining a direction in which the best signal is received from the selected BTS; and selecting at least one of the link antennas for communication with BTSs according to the determined direction.

17. The mobile communication repeating method of claim 16, wherein the information stored and/or updated in the propagation environment information storage includes the strength of a pilot signal at each link antenna for each location and each direction.

18. The mobile communication repeating method of claim 16, wherein the detection of the movement state comprises detecting the location and direction of the moving object and the detection of the propagation environment comprises detecting a pilot signal received at each of the link antennas according to each location and each direction.

19. The mobile communication repeating method of claim 16, wherein the serving BTS selection comprises selecting the serving BTS so as to reduce the number of changes of the serving BTS and thus decrease the number of handoffs.

20. The mobile communication repeating method of any of claims 16 to 19, wherein the antenna selection comprises selecting a link antenna steered to the direction of a BTS from which the best signal is received at a corresponding location, if the velocity of the moving object is equal to or lower than a predetermined threshold.

21. The mobile communication repeating method of any of claims 16 to 19, further comprising relaying only a pilot signal of the selected BTS.

* * * * *